US012689553B2

(12) United States Patent
Stephan et al.

(10) Patent No.: US 12,689,553 B2
(45) Date of Patent: Jul. 21, 2026

(54) METHOD AND DEVICE FOR CONFIGURATION OF AN ACCESS UNIT IN A VIRTUALIZED ENVIRONMENT

(71) Applicant: ORANGE, Issy-les-Moulineaux (FR)

(72) Inventors: Emile Stephan, Chatillon Cedex (FR); Romuald Corbel, Chatillon Cedex (FR); Bini Angui, Chatillon Cedex (FR); Veronica Quintuna Rodriguez, Chatillon Cedex (FR)

(73) Assignee: ORANGE, Issy-les-moulineaux (FR)

( * ) Notice: Subject to any disclaimer, the term of this patent is extended or adjusted under 35 U.S.C. 154(b) by 85 days.

(21) Appl. No.: 18/576,919

(22) PCT Filed: Jun. 23, 2022

(86) PCT No.: PCT/FR2022/051228
§ 371 (c)(1),
(2) Date: Jan. 5, 2024

(87) PCT Pub. No.: WO2023/281181
PCT Pub. Date: Jan. 12, 2023

(65) Prior Publication Data
US 2024/0291712 A1 Aug. 29, 2024

(30) Foreign Application Priority Data
Jul. 8, 2021 (FR) ...................................... 2107382

(51) Int. Cl.
*G06F 15/177* (2006.01)
*H04L 41/0806* (2022.01)
(Continued)

(52) U.S. Cl.
CPC ...... *H04L 41/0806* (2013.01); *H04L 41/0895* (2022.05); *H04L 43/20* (2022.05); *H04L 43/50* (2013.01)

(58) Field of Classification Search
None
See application file for complete search history.

(56) References Cited

U.S. PATENT DOCUMENTS 8,826,268 B2 * 9/2014 Jacobson ............ G06F 9/44505
717/174
8,893,009 B2 * 11/2014 Raleigh ................... H04W 4/24
709/217
(Continued)

FOREIGN PATENT DOCUMENTS

FR        3081582 A1    11/2019
WO    2020174156 A1    9/2020

OTHER PUBLICATIONS

International Search Report dated Sep. 22, 2022 for corresponding International Application No. PCT/FR2022/051228, filed Jun. 23, 2022.

(Continued)

*Primary Examiner* — Phuoc H Nguyen
(74) *Attorney, Agent, or Firm* — David D. Brush; Westman, Champlin & Koehler, P.A.

(57) ABSTRACT

A process implemented by an administration entity for configuring an access unit of a communication network in a virtualised environment having an operating software application. The process includes receiving, from a mediating entity of the operating software application, a log message of the operating software application associating an identifier of the operating software application and an identifier of a node supporting the operating software application. Prior to or following receipt of the log message, the administration entity determines an operating software application for hosting the access unit based on a test relating to a placement criterion relating to a data stream conveyed by the access unit. The administration entity then emits, to the mediating entity of the determined operating software application, a (Continued)

message for configuring the access unit in the determined operating software application, the message including an identifier of at least one other access unit of the communication network.

14 Claims, 4 Drawing Sheets

(51) Int. Cl.
| | |
|---|---|
| *H04L 41/0895* | (2022.01) |
| *H04L 43/20* | (2022.01) |
| *H04L 43/50* | (2022.01) |

(56) References Cited

U.S. PATENT DOCUMENTS 10,908,837 B2 *   2/2021   Fetik ..................... G06F 3/0653

2011/0219385 A1 *   9/2011   Jacobson ............ G06F 9/45558
                                                               709/224
2019/0146707 A1 *   5/2019   Fetik ................... H04L 67/1097
                                                               726/11
2020/0249936 A1 *   8/2020   Barfield, Jr. .............. G06F 8/60
2021/0185601 A1 *   6/2021   Altay ................... H04L 47/805

OTHER PUBLICATIONS

Written Opinion of the International Searching Authority dated Sep. 22, 2022 for corresponding International Application No. PCT/FR2022/051228, filed Jun. 23, 2022.
English translation of the Written Opinion of the International Searching Authority dated Sep. 22, 2022 for corresponding International Application No. PCT/FR2022/051228, filed Jun. 23, 2022.

* cited by examiner

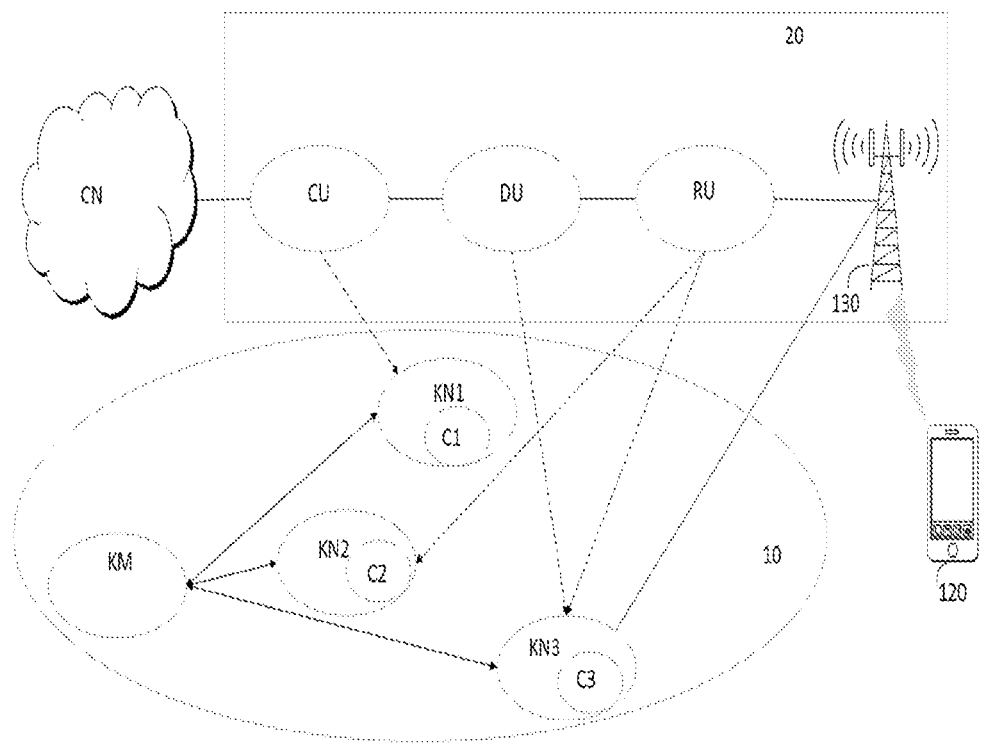
[Fig 1]

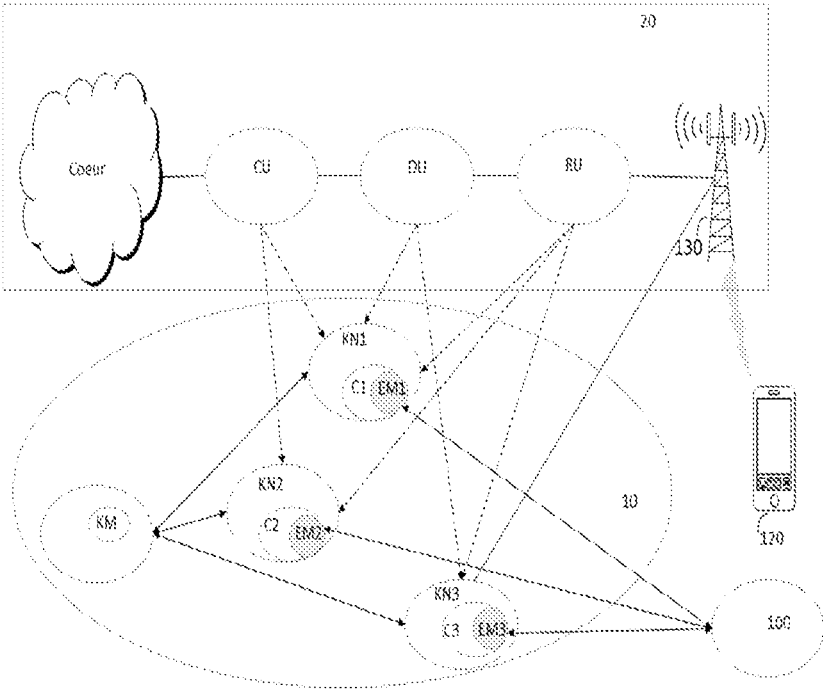
[Fig 2]

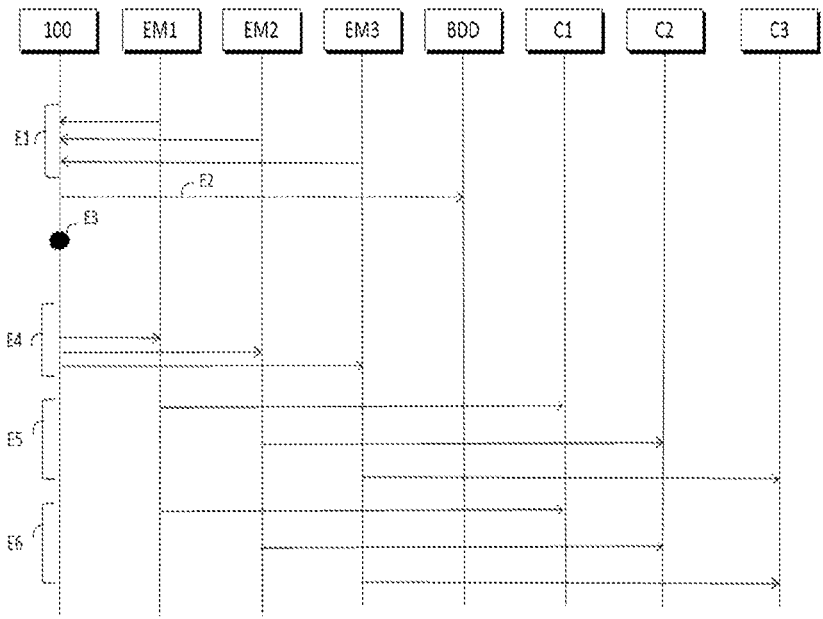
[Fig 3]
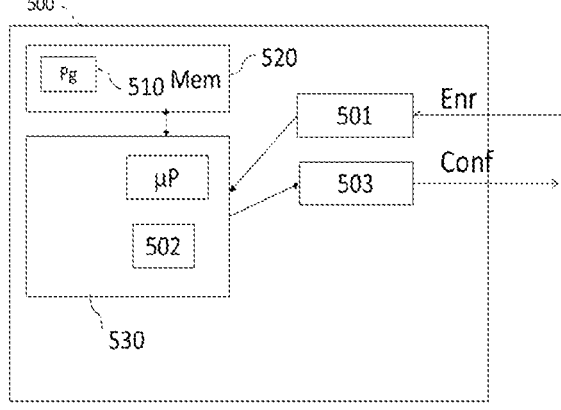
[Fig 4]

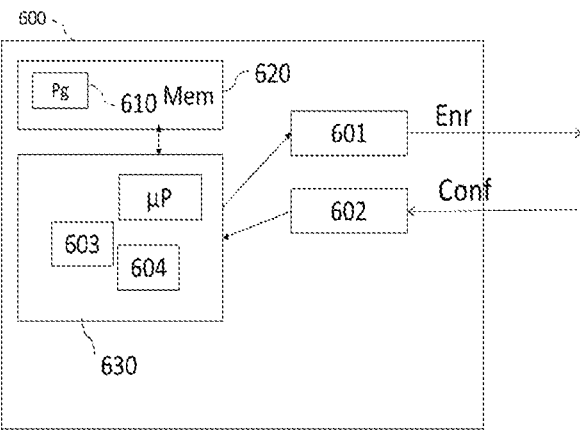
[Fig 5]

METHOD AND DEVICE FOR CONFIGURATION OF AN ACCESS UNIT IN A VIRTUALIZED ENVIRONMENT

CROSS-REFERENCE TO RELATED APPLICATIONS

This Application is a Section 371 National Stage Application of International Application No. PCT/FR2022/051228, filed Jun. 23, 2022, which is incorporated by reference in its entirety and published as WO 2023/281181 A1 on Jan. 12, 2023, not in English.

1. TECHNICAL FIELD

The invention relates to the automated deployment or to the updating of an access infrastructure of a communications network in a virtualized environment based on a service platform relying on operating software applications, such as virtual containers or machines. The automated deployment of the access infrastructure takes into account network performance parameters, security, energy, costs of entities for the functional and geographical distribution of the entities composing this infrastructure.

2. PRIOR ART

Communications network access architectures, and more particularly the access infrastructures for mobile networks, are undergoing significant developments. From an infrastructure where all of the processing operations (allocation of resources, modulation, encoding, etc.) allowing the access of the terminals were distributed, within the radio sites, as near as possible to the antennas, the tendency is now toward a greater or lesser centralization of some of these processing operations depending on availability, quality of service and notably latency criteria. Thus, notably in 3GPP and within the Open RAN alliance, works are being undertaken for specifying these new access infrastructures. Three identified entities—CU (Centralized Unit), RU (Radio Unit) and DU (Distributed Unit)—are distinguished within these new infrastructures. These units are differentiated by their position in the communications network and hence also by their number in the network since the closer a unit is to the radio station, the more of them needs to be deployed. In order to envision the deployment of such new infrastructures, the processing operations must be implemented in one or the other of these entities. It can quite clearly be seen that although a centralization of a processing operation is more advantageous in terms of cost and of management, it also has drawbacks in terms of vulnerability and notably of latency. Such access infrastructures may therefore have various instantiations depending on the placement of the processing operations retained in the various units and hence depending on the interfaces required between the units. These new infrastructures, called Cloud RAN (Cloud Radio Access Networks), are furthermore characterized by the implementations of software applications deployed on general purpose data processing servers, at a lower cost, the intelligence and the advanced services being implemented using software applications. The deployment of these new architectures, notably in the framework of the development of the new 5G architectures but also for the future versions of mobile networks, is based on virtualization techniques which may more specifically be containerization techniques, this latter technique being characterized by the absence of a hypervisor in charge of managing the various virtual machines. A technique for management of containers, for example implemented using a solution such as Kubernetes, already widely used in data centers, could prove to be very relevant for deploying in the automatic updating of these Cloud RAN architectures.

Kubernetes is a platform allowing the deployment, the scale-up and the implementation of application containers on groups (or clusters) of servers.

Kubernetes is composed of two parts, namely the masters allowing all of the deployments within a cluster of servers to be managed.

It is composed of three parts, namely an ETCD (etc distributed) database storing all the data from the cluster of servers, an API server which allows the master, amongst other things, to communicate with the nodes comprising the containers and the controllers whose purpose is to verify the correct operation of the cluster, together with the deployments and the updates.

the nodes, which may be physical machines or virtual machines. The containers are instantiated on the nodes. A node comprises a kubelet which allows communication with the master and the deployments on the node to be managed, a kube-proxy allowing a communication external to the cluster of servers and a Pod in which a container is executed.

The term 'cluster' used in such a containerization solution corresponds to a Masters/Nodes assembly such as described hereinabove.

Although the implementation of a Cloud RAN infrastructure based on a containerization solution, such as Kubernetes, offers a certain advantage, such an implementation however presents some problems notably relating to the deployment of such a solution on distributed sites. Such a solution must allow a Cloud RAN to be deployed certain features of which are recalled hereinafter:

A single association between a CU and a DU, as well as between a DU, a RU and an antenna must be instantiated The architecture retained must allow the performance criteria and, notably, a maximum delay of 1 ms between a DU and an RU to be guaranteed a start-up of the Cloud RAN, and hence of the containers of the entities CU, DU, RU, is allowed by initial configurations. Thus, the DU must know the IP address of the RU, the DU must know the IP address of the CU, etc. . . . .

Constraints specific to a containerization solution, such as Kubernetes, in such a distributed environment are furthermore recalled hereinbelow:

The containerization solution does not allow allocations external to the solution itself and notably not the allocation of the antennas to the container of the RU to be managed Nor does the solution allow the exchange of configurations between the various containers allowing the deployment of the Cloud RAN, and notably the sharing of addressing information for the containers comprising the entities CU, DU and RU of the Cloud RAN The verification that the deployment of containers supporting the functions CU, DU and RU allow compliance with the constraints on performance of these distributed access infrastructure architectures.

The subject of the present invention is to provide improvements with respect to the prior art.

3. DESCRIPTION OF THE INVENTION

The invention will improve the situation by means of a method for configuration of at least one access unit of a communications network in a virtualized environment comprising at least one operating software application, said method being implemented in an administration entity of the communications network and comprising a receipt from a mediation entity of the at least one operating software application of a message for registering the at least one operating software application associating an identifier of the at least one operating software application and an identifier of at least one node supporting the at least one operating software application, prior to or following the receipt of the registration message, a determination of the at least one operating software application for accommodating the at least one unit depending on a result of a test relating to a placement criterion relative to a data stream routed by the at least one unit, a transmission to the mediation entity of the given at least one operating software application of a message for configuration of the at least one unit in the given at least one operating software application, said configuration message comprising an identifier of at least one other access unit of the communications network.

A deployment of a access unit of a communications network, notably of the mobile type, in a virtualized environment, such as a virtualized architecture, requires the instantiation of operating software applications, which may be containers or virtual machines or any other solutions allowing software solutions to be installed providing the routing of data within a network. Such a deployment requires it to be ensured that the positioning of the unit allows constraints on placement and notably on routing to be followed but also that the unit can have the configuration information sufficient for transmitting and receiving data from another unit of the infrastructure. Typically, in a Cloud RAN architecture, the unit DU must be deployed in a container allowing a certain data rate or a certain latency for example to be guaranteed, but also that the unit DU is configured with identifiers, such as IP addresses, of a CU and of a RU. The configuration method thus allows, on the one hand, identifiers of operating software applications and of nodes, physical or virtualized, supporting these containers to be obtained, which allows the data from a node and from an operating software application to be routed to another. The method furthermore allows the compliance with constraints on deployment of a unit with respect to the position and to the capacity of the operating software applications and hence of the nodes comprising these operating software applications to be ensured by virtue of a determination of the operating software application using a test. Based on the result of this test, it is then possible to be able to configure the unit (CU, DU, or RU in the example) in a given operating software application, since it has been determined that the operating software application could effectively satisfy the need. The access infrastructure may furthermore be initialized by virtue of the configuration information since each unit holds information on configuration of another unit with which the configured unit transmits and receives data coming from or going to terminals attached to the access infrastructure.

According to one aspect of the invention, in the configuration method, the placement criterion relative to a data stream corresponds to one or more of the criteria in the following list:

a security of the data stream,
  a quality of service for routing of the data stream,
  an energy consumption linked to the data stream, a latency of the data stream,
  a jitter of the data stream,
  a loss of data in the stream,
  a routing of the data stream via a node of the communications network,
  a routing of the data stream via an ordered series of nodes of the communications network.

The deployment of access infrastructure units, whether this be an initial deployment or an update of an access infrastructure with new units, must meet certain constraints. Thus, the choice of a container is advantageously determined according to a criterion relating to a data security and confidentiality criterion managed by a container comprising a unit, to a QoS criterion for routing of the data, to availability of an operating software application and hence of the unit supported by the operating software application, to energy consumption of the operating software application in the virtualized environment for routing the data stream, or else to latency of the data transiting via the operating software application. The determination and the availability of a node of the network via which a data stream has to transit may also be used as a placement criterion. Several of these criteria may advantageously be considered in the test for determining the optimum operating software application being able to host the unit to be configured.

According to another aspect of the invention, in the configuration method, the test relating to a placement criterion comprises a comparison of a routing time of a data stream coming from, respectively going to, the at least one operating software application and going to, respectively coming from, another operating software application of the virtualized environment, with a routing value of a reference data stream.

More specifically, and since the routing time must be taken into account with respect to a traffic type (for example of the IoT (Internet of Things) type, of the streaming video type, of the voice type, etc.), it may be advantageous to evaluate an operating software application by its capacity to effectively provide a routing corresponding to the prerequisites of a selected traffic type, for example by choosing the most restrictive service in terms of transit time within a set of data associated with a plurality of services.

According to another aspect of the invention, in the configuration method, the test relating to a placement criterion comprises a comparison of a routing time and a measurement of service quality of a data stream coming from, respectively going to, the at least one operating software application and going to, respectively coming from, another operating software application of the virtualized environment, with theoretical routing values specific to a specific architecture of the communications network. The architectures of the infrastructures, and notably the choice of the positioning of the various functions (modulation, coding, etc.) within a unit leads to specific routing and quality of service capacities between the units. For example, in the framework of a Cloud RAN architecture, various deployment scenarios have been specified, giving rise to specific routing needs, such as rate, latency or, more globally, quality of service, for example. The comparison of test measurements with such needs allows the operating software application(s) most suited to hosting an access unit of the communications network to be determined.

According to another aspect of the invention, in the configuration method, the at least one operating software application is furthermore determined as a function of the geographical position of an attachment equipment of the communications network.

Notably, for the determination of the operating software application able to accommodate an entity positioned as close as possible to an attachment equipment, such as an antenna, the choice of an operating software application takes the position of the attachment equipment into account for reasons of deployment, of latency of the data, and of compliance with routing conditions linked to the services whose data are routed over the communications network comprising the operating software applications.

According to another aspect of the invention, the configuration method furthermore comprises at least one transmission to an administration entity of the virtualized environment of a request message from the at least one node in the virtualized environment at least one receipt coming from the administration entity of the virtualized environment of a response message comprising an identifiers of the at least one node.

The method may advantageously comprise steps allowing the administration entity of the communications network to regularly obtain an update of the virtualized environment and a list of the nodes effectively deployed supporting an operating software application being theoretically able to accommodate a unit of an access infrastructure. These steps, repeated periodically over time or otherwise, provide the administration entity of the communications network with an up-to-date knowledge of the virtualized environment used for the deployment or the updating of the access infrastructure. The administration entity of the virtualized environment is, according to one example, a "master Kubernetes" node.

According to another aspect of the invention, in the configuration method, the response message furthermore comprises a datum for localization of the at least one node.

The response message received, coming from the administration entity of the virtualized environment, may advantageously comprise data on localization of the nodes notably with a view to being able to deploy a unit of the infrastructure as close as possible to an attachment equipment or for managing the necessary interactions between the units of the infrastructure while taking into account the geographical constraints on their instantiation in the containers included in the nodes.

According to another aspect of the invention, the configuration method furthermore comprises the receipt of a command message for an updating of the communications network comprising a geographical datum from at least one access unit of the network. The response message received, coming from the administration entity of the virtualized environment, may advantageously comprise data on localization of the nodes notably with a view to being able to deploy a unit of the infrastructure as close as possible to an attachment equipment or for managing the necessary interactions between the units of the infrastructure while taking into account the geographical constraints on their instantiation in the containers included in the nodes.

According to another aspect of the invention, the configuration method furthermore comprises the receipt of a command message for an updating of the communications network comprising a geographical datum from at least one access unit of the network. The command message corresponds for example to a new affiliation of an access unit. The administration entity of the communications network receives a command for an update, which may correspond to an initial instantiation, of an access infrastructure of the communications network for example, a deployment of a unit CU, of a unit DU and of a unit RU. The command comprises a geographical datum, for example a GPS datum, of an access unit in order to cover or improve the coverage of a new geographical region for example. This command message may be sent out by an administrator network or an external software application such as an ONAP (Open Network Automation Platform) application.

According to another aspect of the invention, in the configuration method, the configuration message furthermore comprises a configuration parameter relating to an equipment for attachment to the communications network.

Configuration parameters relating to the attachment equipment, for example to an antenna, may advantageously be transmitted to a mediation entity, notably if it is a mediation entity of a unit responsible for the functions which must be activated as close as possible to the attachment equipment, such as a unit RU in a Cloud RAN infrastructure. There exists a strong dependency between an attachment equipment, such as an antenna, and an RU in particular. In order for the access system deployed to operate correctly, the RU obtains a minimum of information on the type of the antenna. For example, in relation to the configuration parameters, an FPGA code which is executed in the antenna is necessary and it is advantageous to have the precise version of the antenna in order to execute the right code or again how to contact the antenna (USB port, network interface, etc.).

According to another aspect of the invention, the configuration method furthermore comprises a message for obtaining a set of operating software applications from a database, said set relating to the geographical datum on an access unit of the infrastructure.

Notably, when it has received an update command message, the administration entity of the communications network consults a database comprising the nodes and the operating software applications of the virtualized environment. The database returns to the administration entity operating software applications and possibly identifiers of the nodes supporting the operating software applications corresponding to a geographical datum, for example a GPS datum, of an access unit, for example situated as close as possible to an antenna of the access infrastructure. Advantageously, the database sends back the IP addresses of the operating software applications that are able to accommodate units of the communications network, together with the IP addresses of the nodes comprising these operating software applications. Thus, the administration entity disposes of a list of possible operating software applications amongst which it will determine the operating software applications responsible for accommodating the respective units depending on results of tests. The database may furthermore advantageously comprise and send back parameters of an attachment equipment (antenna), where the type of attachment equipment may have an influence on the localization of the units of the infrastructure in operating software applications. The various aspects of the configuration method which have just been described may be implemented independently of one another or in combination with one another.

The invention also relates to a method for management of at least one access unit of a communications network in a virtualized environment comprising at least one operating software application, said method being implemented in a mediation entity of the at least one operating software application and comprising a transmission to an administration entity of the communications network of a message for registration of the at least one operating software application associating an identifier of the at least one operating software application and an identifier of at least one node supporting the at least one operating software application, a receipt of a message, coming from the administration entity of the communications network, for configuration of the at least one unit in the at least one operating software application determined by the administration entity, said configuration message comprising an identifier of at least one other unit of the communications network, a configuration of the at least one operating software application on the basis of the configuration message received, an activation of the at least one access unit in the at least one operating software application configured.

The invention also relates to a device for configuration of at least one access unit of a communications network in a virtualized environment comprising at least one operating software application, and comprising a receiver designed to receive a message, coming from a mediation entity of the at least one operating software application, for registration of the at least one operating software application associating an identifier of the at least one operating software application and an identifier of at least one node supporting the at least one operating software application, a determination module, designed to determine, prior to or following the receipt of the registration message, the at least one operating software application for accommodating the at least one unit depending on a result of a test relating to a placement criterion relative to a data stream routed by the at least one unit, a transmitter, designed to transmit to the mediation entity of the at least one operating software application determined a message for configuration of the at least one unit in the at least one operating software application determined, said configuration message comprising an identifier of at least one other access unit of the communications network.

This device, designed to implement in all its embodiments the configuration method which has just been described, is intended to be implemented in an administration equipment of a communications network or else in a management equipment of an access infrastructure, such as a C-RAN infrastructure.

The invention also relates to a device for management of at least one access unit of a communications network in a virtualized environment comprising at least one operating software application, comprising a transmitter, designed to transmit to an administration entity of the communications network, a message for registration of the at least one operating software application associating an identifier of the at least one operating software application and an identifier of at least one node supporting the at least one operating software application, a receiver designed to receive a message, coming from the administration entity of the communications network, for configuration of the at least one unit in the at least one operating software application determined by the administration entity, said configuration message comprising an identifier of at least one other unit of the communications network, a configurator, designed to configure the at least one operating software application on the basis of the configuration message received, an activator, designed to activate the at least one access unit in the at least one operating software application configured.

This device, designed to implement the management method which has just been described, is intended to be implemented in a physical or virtualized equipment, such as a server or a non-specific docking station.

The invention also relates to a system for configuration of at least one access unit of a communications network in a virtualized environment comprising at least one operating software application, and comprising a configuration device and a management device.

The invention also relates to computer programs comprising instructions for the implementation of the steps of the respective configuration and management methods which have just been described, when both these programs are executed by a processor and a storage medium respectively readable by a configuration and management device on which the computer programs are stored.

The aforementioned programs may use any given programming language, and may take the form of source code, object code, or of code intermediate between source code and object code, such as in a partially compiled form, or in any other desired form.

The aforementioned information media may be any given entity or device capable of storing the program. for example, a medium may comprise a storage means, such as a ROM, for example a CD ROM or a microelectronic circuit ROM, or else a magnetic recording means.

Such a storage means may for example be a hard disk, a flash memory, etc. Furthermore, an information medium may be a transmissible medium such as an electrical or optical signal, which may be routed via an electrical or optical cable, by radio or by other means. A program according to the invention may in particular be down/uploaded over a network of the Internet type.

Alternatively, an information medium may be an integrated circuit within which a program is incorporated, the circuit being designed to execute or to be used in the execution of the methods in question.

4. BRIEF DESCRIPTION OF THE DRAWINGS

Other features and advantages of the invention will become more clearly apparent from reading the following description of particular embodiments, given by way of simple illustrative and non-limiting examples, and from the appended drawings, amongst which:

FIG. 1 shows a simplified view of a communications network in which the configuration method and the management method according to one aspect of the invention are implemented, FIG. 2 shows a simplified view of a communications network in which the configuration method and the management method according to another aspect of the invention are implemented, FIG. 3 shows a schematic overview of the configuration method and of the management method according to one embodiment of the invention, The FIG. 4 shows a configuration device according to one embodiment of the invention, The FIG. 5 shows a management device according to one embodiment of the invention.

5. DESCRIPTION OF THE EMBODIMENTS

In the following part of the description, embodiments of the invention within a communications network are described. This network may be implemented for routing communications data to fixed or mobile terminals. The invention may be used for the deployment or for the updating of access units of a communications network, the access units being defined as units allowing terminals to route data to data servers or other terminals via the communications network.

Reference is first of all made to [FIG. 1] which shows a simplified view of a communications network in which the configuration method and the management method according to one aspect of the invention are implemented.

A communications network 20 is composed of an access unit RU, of an entity DU and of an entity CU allowing data streams going to and coming from a core network CN to be routed. The network 20 furthermore comprises an attachment equipment 130, represented by an antenna of the cellular type according to this example, allowing a terminal 120 to be able to transmit and receive data via the network 20. The attachment equipment 130 may comprise a plurality of antennas. In [FIG. 1], only a single unit of the RU, DU, CU type, together with a single attachment equipment, is shown but a network may comprise a plurality of units and of attachment equipment may be included in this network 20. This structuring in three units RU/DU/CU of a network is also identified in the prior art as a Cloud-RAN architecture. Thus, within the 3GPP standard body, the distribution of the functions and of the processing operations allowing the routing of data within the network 20 in one or the other units RU/DU/CU give rise to discussions and to specifications. Thus, around ten options, also referred to as Splits, have been defined within the 3GPP standard depending on whether certain functions are centralized or otherwise considering the impact on the links between the units and on the services for the users. For example, the split 7.3 includes encoding and decoding of the signals in the unit DU and thus reduces the financial cost of the links between the unit RU and the unit DU, also referred to as Fronthaul. This structuring of the network 20 into units is furthermore accompanied by a virtualization of the units RU/DU/CU allowing its cost to be reduced and its deployment to be facilitated and/or the updating by the use of non-specific nodes, in the form of data processing servers and of software applications deployed on these nodes, in the form of VNFs (Virtual Network Functions) or CNFs (Cloud Native Network Functions) depending on the type of infrastructure selected for the implementation of the network 20. These software applications thus allow the various functions and processing required for the routing of the data to be implemented. The deployment of such a network 20 of the cloud RAN type is based on a division into three geographical regions: the regional clouds, the edge clouds, the far edge clouds, notably defined by the O-RAN (Open Radio Access Network) alliance. In [FIG. 1], a virtualized environment 10 is also shown. According to this example, the virtualized environment 10 is based on a Kubernetes platform, representing a solution for orchestration of operating software applications represented here by containers, but it could also be a distinct Kubernetes virtualization platform. This virtualized environment is composed of a Kubernetes master KM and of nodes KN1, KN2, KN3 which may be physical machines or else virtual machines. According to one alternative, the attachment equipment 130, comprising one or more antennas, may itself be a node such as the nodes KN1, KN2, KN3 and may accommodate a unit CU, DU or RU. It should be noted that this embodiment is notably appropriate for the deployment of the unit RU in an equipment also disposing of one or more antennas, so as to reduce the latency time for transmission of data between an antenna and the unit RU. Each node contains the services necessary for the execution of Pods, in other words places for execution of the operating software applications. Three nodes KN1, KN2 and KN3 are shown in [FIG. 1] but a higher number of nodes may be included in the virtualized environment 20. The nodes KN1, KN2 and KN3 respectively comprise the operating software applications C1, C2, C3. In accordance with the architecture of the Cloud RAN network described hereinabove, the Kubernetes master KM is deployed in the regional cloud and the nodes KN1, KN2 and KN3 are deployed in the regional clouds or the edge clouds or the far edge clouds.

An administrator network or else a third-party software application, for example of the ONAP (Open Network Automation Platform) type, requests from the Kubernetes master KM the deployment of operating software applications C1, C2, C3 in the nodes KN1, KN2, KN3. At this stage, the operating software applications C1, C2 and C3 are not activated and are not capable of routing data. This step allows the operating software applications to be initialized. These operating software applications comprise mediation entities allowing the ability to interact with the master KM. Thus, a unit of the CU type is deployed in an operating software application C1 of the regional node KN1, a unit of the DU type is deployed in an operating software application C3 of an edge node KN3 and a unit RU is deployed in an operating software application C2 of a far edge node KN2. The configuration method, according to this embodiment, allows the most appropriate container C1, C2 or C3 for accommodating a given access unit to be determined and the ability to configure this unit on the most suitable operating software application, notably with respect to the geographical situation of the attachment equipment and/or placement criteria relating to a data stream, for example transmitted or received by the terminal 120, routed by a given access unit. The positioning of the unit RU with respect to the attachment equipment is in particular to be considered with the knowledge that it is important to avoid too high a latency between the antenna and the unit RU.

With regard to [FIG. 2], a simplified view of a communications network is depicted in which the configuration method and the management method according to another aspect of the invention are implemented.

In this [FIG. 2], the same entities can be seen as those shown in [FIG. 1] together with an entity 100 for administration of the communications network 20. This administration entity 100, which may also be called a BCRS (Bootstrapper cloud-RAN server), may, according to one example, be deployed in a regional cloud and notably allows the list of the hardware resources to be managed and their management to be provided. It furthermore allows the various elements of the Cloud RAN and notably the various units RU/DU/CU to be interlinked, together with the management of the performance and notably the measurements of performance between the units RU/DU/CU. This entity is distinct from a master KM but, according to one alternative, it may be instantiated in a master KM. Mediation entities EM1, EM2, and EM3 of the respective operating software applications C1, C2, C3 are also shown in [FIG. 2]. A mediation entity EM1 or EM2 or EM3 is also called a BCRC (Bootstrapper Cloud-RAN client) and notably allows an operating software application (C1 or C2 or C3) to interact with the administration entity 100.

According to one example, the administration entity may, prior to the receipt of one of the operating software applications EM1, EM2, EM3, coming from a mediation entity, request from the master KM a list of nodes KN1, KN2 and KN3 that it is managing.

In return, the master KM sends back to the administration entity 100 a list of identifiers, such as IP addresses if it is an IP network, of the nodes KN1, KN2 and KN3, together with information or a label on the geographical region in which a 3-level communications network is deployed: regional, edge and far edge, in which the node KN1, KN2 or KN3 is located, possibly together with a state of the node in order to indicate whether it is effectively active or inactive in the virtualized space 10. This information received by the administration entity 100 could be subsequently saved in a database, and thus be available if needed. During this phase of discovery of the virtualized environment 10 by the administration entity 100, the search for all of the access equipments, here represented by the antenna 130, is carried out. This search is carried out by consulting the nodes from amongst the nodes KN1, KN2, KN3 located in a far edge cloud and furthermore in an active state or ready or else ready within an interval of time, with the knowledge that only a far edge cloud is able to comprise an antenna to which the terminal 120 may attach itself. In this case, according to the example described for [FIG. 1], the administration entity 100 consults the node KN2 in order to discover whether an antenna is available, but according to one example where a plurality of nodes located in far edge clouds are available, the administration entity 100 would consult these various nodes. In return, the nodes consulted transmit to the administration entity 100 the parameters for connection to an antenna such as the USB ports, the information on the FPGA (Field Programmable Gate Array) types specific to the antenna, the type of antenna and the localization coordinates of the far edge cloud, such as GPS (Global Positioning System) localization information. According to one alternative, the administration entity 100 may transmit a request to a topological database comprising all of the information on the deployments of physical equipments of a region in order to obtain the information on the antennas available in far edge clouds. In order to target these far edge clouds, the identifiers of the nodes of the far edge clouds may, according to one example, be transmitted as parameters of the transmitted request. The administration entity 100 may also save this information received on the antennas in a database. These various steps for discovery of nodes and of antennas by the administration entity 100 may be repeated so that the administration entity 100 has an up-to-date mapping. The administration entity 100 may also carry out the configuration of a unit in the absence of these steps, for example by referring to a database that it will itself have updated or updated by another entity. According to one alternative, or for updating an access network in a virtualized environment, an administrator network or else a third-party software application, for example of the ONAP type, consults the administration entity 100 in order to deploy one or more units CU/DU/RU in the virtualized space 20. According to one example, information on localization of a unit RU is transmitted as parameters of this consultation for example in order to cover or to improve the coverage of the given 3-level communications network corresponding to the information on localization of the entity RU, close to a receiving antenna. The administration entity 100 may thus request from a database, that it will itself already have previously updated or otherwise, a list of nodes KN1, KN2, KN3 likely to meet the needs of the deployment request. The database may search for the closest nodes KN1, KN2, KN3 from the information on localization received during the deployment request and transmitted to the database. The database transmits in return to the administration entity 100 the nodes (KN1, KN2, KN3)/operating software applications (C1, C2, C3) associations that it judges possible for the deployment or the updating of the cloud RAN. All of the combinations for the unit CU, in other words an identifier of the unit CU and identifier of the node KN1 or KN2 or KN3, and in the same way for the unit DU and the unit RU. The parameters of the attachment equipment may also be transmitted. The administration entity 100 proceeds with an affiliation CU/DU/RU/antenna depending on the response received from the database. The nodes retained at this step are then candidates to be selected for evaluation of their capacity to conform to placement criteria or localization criteria. With regard to [FIG. 3], a schematic overview of the configuration method and of the management method according to one embodiment of the invention is shown. In this embodiment, the operating software applications are containers. In this [FIG. 3], the same entities as those shown in [FIG. 1] and [FIG. 2] can be seen.

During a step E1, the mediation entities EM1, EM2 and EM3 of the respective containers C1, C3, C3 respectively transmit to the administration entity 100 messages for registration of the containers C1, C2, C3. These registration messages individually sent by each mediation entity EM1, EM2 and EM3 comprise an identifier of the container in question, such as an IP address, together with an identifier of the node on which the container is deployed. According to this embodiment, and with regard to [FIG. 1] and [FIG. 2], the mediation entities EM1, EM2, EM3 respectively transmit an identifier, such as an IP address, of the nodes KN1, KN2 and KN3. It should be noted that, according to one alternative, only one or more mediation entities from amongst EM1, EM2, EM3 can transmit a registration message to the administration entity 100. The identifiers, here the IP addresses, are for example dynamically allocated to the containers C1, C2 and C3 and also to the nodes KN1, KN2, KN3 and cannot be known to the administration entity 100 prior to this transmission and the effective start-up of the container.

Optionally, during a step E2, the mediation entity 100 may save the data received during the step E1 and relating to the containers in a database, for example identical to that described in [FIG. 2], thus allowing it to be re-used where needed.

It should be noted that this registration step may take place after the step for initialization of the containers such as described in [FIG. 1].

Furthermore, this step E1 may be executed following or preceding a step for CU/DU/RU/antenna affiliation such as described in [FIG. 2].

During a step E3, the administration entity 100 determines a container for accommodating a unit CU/DU/RU depending on a result of a test relating to a placement criterion linked to a data stream routed by the unit to be deployed in a container. It should be noted that this determination step E3 may take place prior to the step E1 and following the initialization and affiliation steps described in [FIG. 1] and [FIG. 2].

One example of a determination step is described hereinbelow. In order to determine the containers able to accommodate a unit CU and/or a unit DU and/or a unit RU, the administration entity 100 sends a request to the master KM (not shown in [FIG. 3] but shown in [FIG. 1] and [FIG. 2]) for the creation of all of the containers needed to simulate a traffic of a cloud RAN and to obtain from it the information resulting from this simulation. The Master KM creates the following containers in a regional cloud: a transmitter for transmitting the data for simulating the download data stream, a receiver for receiving the upload data stream, a test unit CU allowing the data of a stream to be routed toward a test unit DU in the download direction and toward the receiver of the regional cloud in the upload direction. The Master KM furthermore creates a unit DU in an edge cloud so that the latter routes the data toward a unit RU in the download direction and toward the unit CU in the upload direction. The master KM furthermore creates in a far edge cloud a receiver for receiving the data of a stream in the download direction, a transmitter for sending data of a simulated stream in the upload direction and a unit RU for routing the data toward the receiver of the far edge cloud in the download direction and toward the test unit DU in the upload direction. A test data stream is generated and transmitted by the respective transmitters of the clouds to the respective receivers for simulating the upload and download data stream. According to one example, the data streams characterizing architecture options for a Cloud RAN infrastructure are transmitted, where these data streams may be differentiated according to their direction of transmission, upload or download, and according to the technologies of the interfaces between the entities of the infrastructure.

The administration entity 100 subsequently acquires the information stored in the various test entities created in the regional, edge and far edge clouds. This stored information comprises for example parameters on quality of routing of the data stream such as for example the real data rate attained, criteria on availability of the unit, energy criteria such as the energy consumption of the unit for routing the data stream, a criterion on latency, on jitter of the data stream, a criterion on loss of data or a criterion on routing by one equipment in particular or otherwise. These placement criteria obtained allow the ability to qualify a unit and its correct or poor placement within the virtualized environment.

The test relating to one or more placement criteria may advantageously comprise a comparison with a reference value for the data stream, such as for example a reference routing time. Notably, in order to determine a container capable of accommodating a unit, the administration entity 100 may compare a routing time of a data stream in a unit deployed in a container C1, C2, C3 of the virtualized environment with a reference value of a specific architecture of the Cloud RAN communications network, such as for example presented in the table hereinabove, and, with the aid of the result of this comparison, determine whether the container C1, C2 or C3 is capable of accommodating a unit CU or DU or RU.

According to another alternative, the reference value relates to a specific data stream, for example of a data stream demanding a particular requirement in terms of reliability and/or of routing time and/or of latency.

It should be noted that, according to one alternative, the container may also be determined depending on a geographical position of an attachment equipment, such as an antenna of a cellular network for example. Notably, the container from amongst the containers C1, C2, C3 could be selected for accommodating a unit RU depending on the geographical position of an antenna so as to reduce the transit time for data between the antenna and the entity RU.

Optionally, the administration entity 100 requests from the nodes of the clouds on which the various test entities have been instantiated the elimination of these entities (transmitters, receivers, test CU, test DU, test RU) created for performing the tests required for the determination of the containers C1, C2, C3 capable of accommodating the units CU/DU/RU depending on the criteria used and possibly the localization information mentioned hereinabove.

It should be noted that the embodiment developed hereinabove for determining one or more containers is mentioned by way of example and that other options are possible for determining the container(s) such as results of recording of data relating to containers already deployed or previously deployed or else by using theoretical values for example from nomograms or tables.

In the case where no container meets the requirements (data rate, latency, reliability, etc.), new candidate nodes for accommodating containers could be selected and evaluated in accordance with the determination step described hereinabove. These new nodes would then be identified in a new affiliation step.

During a step E4, the administration entity 100 transmits to the mediation entities EM1, EM2, EM3 of the respective containers C1, C2, C3 selected following the determination step E3 and duly registered on the respective nodes KN1, KN2, KN3 a message for configuration of a unit CU in the container C1, of a unit DU in the container C3 and of a unit RU in the container C2. The configuration message comprises, according to one example, the IP addresses of the units, the software versions used in the units, the antenna to be used for the unit RU or specific network configurations such as protocols and port numbers, or even a lifetime of the mediation entities. The configuration message transmitted to the mediation entity EM1 of the container C1, aimed at configuring a unit CU, furthermore comprises an identifier, such as for example an IP address, of the unit DU thus allowing the unit CU to know the entity DU with which it will exchange the data of the streams. The configuration message transmitted to the mediation entity EM3 of the container C3, aimed at configuring a unit DU, furthermore comprises an identifier, such as for example an IP address, of the unit CU together with an identifier (IP address) of a unit RU. The entity DU thus knows the entities CU and RU with which it communicates after its initialization and without static configuration of the containers C1 and C3. The configuration message transmitted to the mediation entity EM2 of the container C2, aimed at configuring a unit RU, furthermore comprises an identifier, such as for example an IP address, of the unit DU thus allowing the unit RU to know the entity DU with which it will exchange the data of the streams. This configuration message, transmitted to the mediation entity EM2 furthermore comprises data characterizing an attachment equipment, such as an antenna, if only so that the unit RU is able to communicate with the attachment equipment using the right interface and the correct algorithm for coding/decoding the data.

During a step E5, the mediation entities EM1, EM2 and EM3, having received the information on configuration of the containers C1, C2, C3 allowing them to effectively accommodate the respective entities CU, RU and DU, configure these containers with the information obtained in such a manner that the Cloud RAN infrastructure can be initialized or else updated.

During the following step E6, the entities EM1, EM2 and EM3 launch the software applications corresponding to the units CU/DU/RU in the respective containers C1, C3 and C2. The service for accessing the network, established using the access units CU/DU/RU in the containers C1, C3, C2 determined according to their capacity to satisfy placement criteria or to comply with a localization constraint and deployed on physical or virtualized nodes KN1, KN3 and KN2, can start.

According to one alternative, the steps E5 and E6 may be executed jointly and the launching of the software applications may be effected during the configuration of the units C1, C2. C3 by the respective mediation entities EM1, EM2 and EM3.

With regard to [FIG. 4], a configuration device 500 according to one embodiment of the invention is described.

Such a configuration device may be implemented in an administration equipment, such as the administration entity 100 of the network according to [FIG. 2] and {FIG. 3], of a communications network or else in an equipment for management of an access infrastructure, such as a C-RAN infrastructure.

For example, the device 500 comprises a processing unit 530, equipped for example with a microprocessor µP, and controlled by a computer program 510, stored in a memory 520 and implementing the configuration method according to the invention. Upon initialization, the code instructions of the computer program 510 are for example loaded into a RAM memory, before being executed by the processor of the processing unit 530. Such a configuration device 500 comprises:

a receiver 501, designed to receive a message Enr, coming from a mediation entity of the at least one operating software application, for registration of the at least one operating software application associating an identifier of the at least one operating software application and an identifier of at least one node supporting the at least one operating software application, a determination module 502, designed to determine, prior to or following the receipt of the registration message, the at least one operating software application for accommodating the at least one unit depending on a result of a test relating to a placement criterion relative to a data stream routed by the at least one unit, a transmitter 503, designed to transmit to the mediation entity of the at least one operating software application determined a message Conf for configuration of the at least one unit in the at least one operating software application determined, said configuration message comprising an identifier of at least one other access unit of the communications network.

FIG. 5 shows a management device 600 according to one embodiment of the invention. Such a management device may be implemented in a physical or virtualized equipment, such as a server or a non-specific docking station.

For example, the device 600 comprises a processing unit 630, equipped for example with a microprocessor µP, and controlled by a computer program 610, stored in a memory 620 and implementing the management method according to the invention. Upon initialization, the code instructions of the computer program 610 are for example loaded into a RAM memory before being executed by the processor of the processing unit 630. Such a configuration device 600 comprises:

a transmitter 601, designed to transmit to an administration entity of the communications network a message Enr for registration of the at least one operating software application associating an identifier of the at least one operating software application and an identifier of at least one node supporting the at least one operating software application, a receiver 602, designed to receive a message Conf, coming from the administration entity of the communications network, for configuration of the at least one unit in the at least one operating software application determined by the administration entity, said configuration message comprising an identifier of at least one other unit of the communications network, a configurator 603, designed to configure the at least one operating software application on the basis of the configuration message received, an activator 604, designed to activate the at least one access unit in the at least one operating software application configured.

The invention claimed is:

1. A configuration method comprising:
configuring at least one access unit of an access infrastructure of a communications network in a virtualized environment comprising at least one operating software application, said configuring being implemented in an administration entity device for administration of the communications network and comprising:
receiving over the communications network a registration message from a mediation entity of the at least one operating software application, for registration of the at least one operating software application associating an identifier of the at least one operating software application and an identifier of at least one node supporting the at least one operating software application;
prior to or following the receipt of the registration message:
determining the at least one operating software application for accommodating the at least one access unit depending on a result of a test relating to a placement criterion relative to a data stream routed by the at least one access unit, the placement criterion being able to qualify the at least one access unit as having a correct placement or a poor placement within the virtualized environment; and
configuring the at least one access unit by transmitting over the communications network to the mediation entity of the determined at least one operating software application a configuration message for configuration of the at least one access unit in the determined at least one operating software application, said configuration message comprising an identifier of at least one other access unit of the access infrastructure of the communications network with which the configured at least one access unit transmits and receives data exchanged with terminals attached to the access infrastructure.

2. The configuration method, as claimed in claim 1, wherein the placement criterion relative to the data stream corresponds to one or more of the criteria from the following list:
a security of the data stream,
a quality of service for routing of the data stream,
an energy consumption linked to the data stream,
a latency of the data stream,
a jitter of the data stream,
a loss of data in the stream,
a routing of the data stream via a node of the communications network,
a routing of the data stream via an ordered series of nodes of the communications network.

3. The configuration method, as claimed in claim 1, wherein the test relating to the placement criterion comprises comparing a routing time of the data stream coming from, respectively going to, the at least one operating software application and going to, respectively coming from, another operating software application of the virtualized environment, with a routing value of a reference data stream.

4. The configuration method, as claimed in claim 1, wherein the test relating to the placement criterion comprises comparing a routing time and a measurement of service quality of the data stream coming from, respectively going to, the at least one operating software application and going to, respectively coming from, another operating software application of the virtualized environment, with theoretical values of routing specific to a specific architecture of the communications network.

5. The configuration method, as claimed in claim 1, wherein the at least one operating software application is furthermore determined according to a geographical position of attachment equipment of the communications network.

6. The configuration method, as claimed in claim 1, furthermore comprising:

at least one transmission to an administration entity of the virtualized environment of a request message from the at least one node in the virtualized environment; and at least one receipt of a response message, coming from the administration entity of the virtualized environment, comprising an identifier of the at least one node.

7. The configuration method, as claimed in claim 6, wherein the response message furthermore comprises a datum for localization of the at least one node.

8. The configuration method, as claimed in claim 1, furthermore comprising receiving a command message for an update of the communications network comprising a geographical datum of at least one access unit of the network.

9. The configuration method, as claimed in claim 1, wherein the configuration message furthermore comprises a configuration parameter relating to equipment for attachment to the communications network.

10. The configuration method, as claimed in claim 1, furthermore comprising receiving a message for obtaining a set of operating software applications from a database, said set being related to a geographical datum of the at least one access unit of the network.

11. A method implemented by a management device and comprising:

managing at least one access unit of an access infrastructure of a communications network in a virtualized environment comprising at least one operating software application, said managing comprising:

transmitting over the communications network to an administration entity device of the communications network a registration message for registration of the at least one operating software application associating an identifier of the at least one operating software application and an identifier of at least one node supporting the at least one operating software application;

receiving over the communications network a configuration message from the administration entity device of the communications network, for configuration of the at least one access unit in the at least one operating software application determined by the administration entity device, said configuration message comprising an identifier of at least one other access unit of the access infrastructure of the communications network with which the configured at least one access unit transmits and receives data exchanged with terminals attached to the access infrastructure;

configuring the at least one operating software application on the basis of the configuration message received so that the at least one access unit communicates with the at least one other access unit; and activating the at least one access unit in the at least one operating software application configured, within the communications network.

12. A device comprising:

at least one processor; and at least one non-transitory computer readable medium comprising instructions stored thereon which when executed by the at least one processor configure the device to configure at least one access unit of an access infrastructure of a communications network in a virtualized environment comprising at least one operating software application, the configuring comprising:

receiving over the communications network a registration message, coming from a mediation entity of the at least one operating software application, for registration of the at least one operating software application associating an identifier of the at least one operating software application and an identifier of at least one node supporting the at least one operating software application;

prior to or following the receipt of the registration message:

determining the at least one operating software application for accommodating the at least one access unit depending on a result of a test relating to a placement criterion relative to a data stream routed by the at least one access unit, the placement criterion being able to qualify the at least one access unit as having a correct placement or a poor placement within the virtualized environment; and configuring the at least one access unit by transmitting over the communications network to the mediation entity of the determined at least one operating software application a configuration message for configuration of the at least one access unit in the determined at least one operating software application determined, said configuration message comprising an identifier of at least one other access unit of the access infrastructure of the communications network with which the configured at least one access unit transmits and receives data exchanged with terminals attached to the access infrastructure.

13. A management device comprising at least one processor; and at least one non-transitory computer readable medium comprising instructions stored thereon which when executed by the at least one processor configure the management device to manage of at least one access unit of an access infrastructure of a communications network in a virtualized environment comprising at least one operating software application, the managing comprising:

transmitting over the communications network to an administration entity device of the communications network, a registration message for registration of the at least one operating software application associating an identifier of the at least one operating software application and an identifier of at least one node supporting the at least one operating software application;

receive a configuration message over the communications network from the administration entity device of the communications network, for configuration of the at least one access unit in the at least one operating software application determined by the administration entity device, said configuration message comprising an identifier of at least one other access unit of the access infrastructure of the communications network with which the configured at least one access unit transmits and receives data exchanged with terminals attached to the access infrastructure;

configure the at least one operating software application on the basis of the configuration message received so that the at least one access unit communicates with the at least one other access unit; and activate the at least one access unit in the at least one operating software application configured, within the communications network.

14. A non-transitory computer readable medium comprising a computer program stored thereon comprising instructions for implementation of a configuration method when the program is executed by at least one processor of an administration entity device of the network, wherein the configuration method comprises:

configuring at least one access unit of an access infrastructure of a communications network in a virtualized environment comprising at least one operating software application, said configuring comprising:

receiving over the communications network a registration message from a mediation entity of the at least one operating software application, for registration of the at least one operating software application associating an identifier of the at least one operating software application and an identifier of at least one node supporting the at least one operating software application;

prior to or following the receipt of the registration message:

determining the at least one operating software application for accommodating the at least one access unit depending on a result of a test relating to a placement criterion relative to a data stream routed by the at least one access unit, the placement criterion being able to qualify the at least one access unit as having a correct placement or a poor placement within the virtualized environment; and configuring the at least one access unit by transmitting over the communications network to the mediation entity of the determined at least one operating software application a configuration message for configuration of the at least one access unit in the determined at least one operating software application, said configuration message comprising an identifier of at least one other access unit of the access infrastructure of the communications network with which the configured at least one access unit transmits and receives data exchanged with terminals attached to the access infrastructure.

* * * * *